(No Model.) 2 Sheets—Sheet 2.
H. K. KING.
SAFETY GEAR WHEEL CONNECTION.
No. 531,046. Patented Dec. 18, 1894.
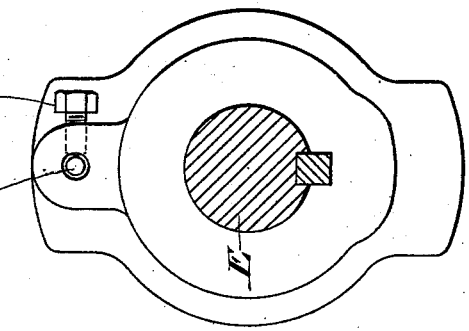
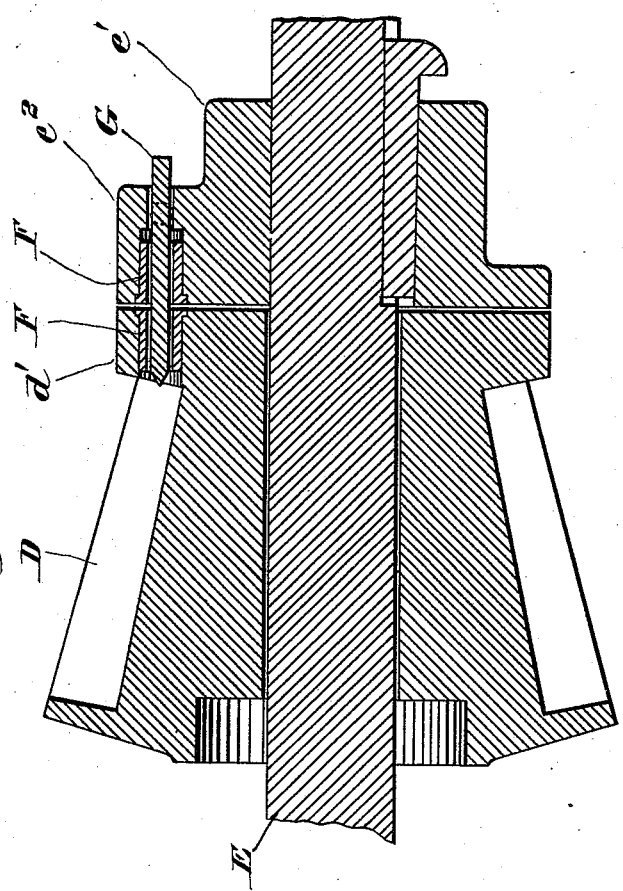
Witnesses: Inventor

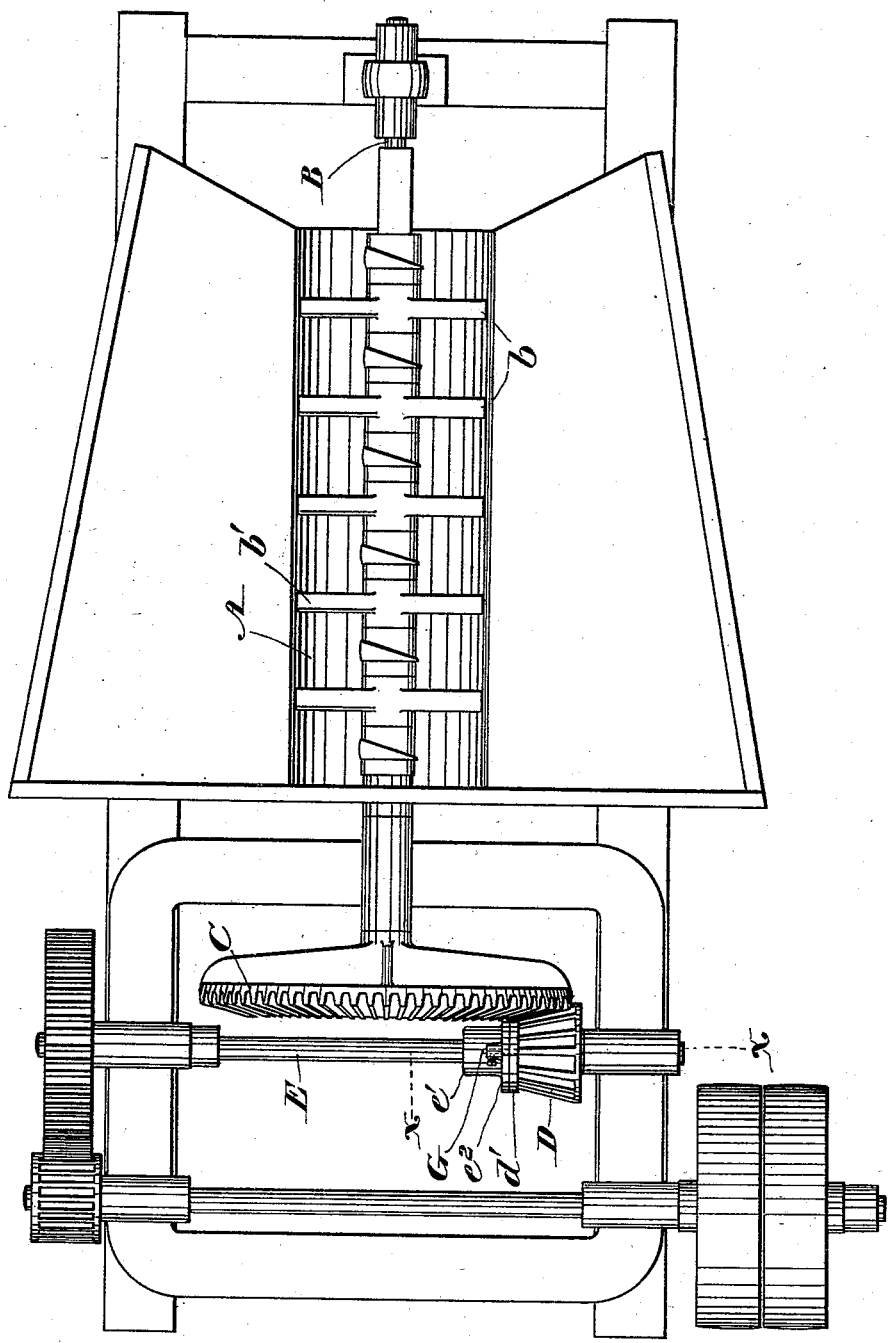

UNITED STATES PATENT OFFICE.

HOWARD K. KING, OF PHILADELPHIA, PENNSYLVANIA, ASSIGNOR TO THE CHAMBERS BROTHERS COMPANY, OF SAME PLACE.

SAFETY GEAR-WHEEL CONNECTION.

SPECIFICATION forming part of Letters Patent No. 531,046, dated December 18, 1894.

Application filed October 28, 1891. Serial No. 410,123. (No model.)

*To all whom it may concern:*

Be it known that I, HOWARD K. KING, a citizen of the United States, residing at the city and county of Philadelphia and State of Pennsylvania, have invented certain new and useful Improvements in Safety Gear-Wheel Connections, of which the following is a full, clear, and exact description, reference being had to the accompanying drawings, of which—

Figure 1 is a plan view of a clay working mill embodying my invention. Fig. 2 is a longitudinal section (as on the line $x-x$, Fig. 1) of the driving pinion and a part of its shaft, enlarged, the safety connection being clearly shown. Fig. 3 is a partial end view of Fig. 2.

This invention is adapted for use in connection with gear wheel mechanisms, and more particularly with the gearing of that class of apparatus which, from the peculiar character of its work, is at times subjected to severe shocks and strains. Clay working or triturating machines are an example of such apparatus, their operating devices sometimes being suddenly checked by the lodgment therein of stones or other hard foreign objects contained in the matter under treatment. In such event, the breaking of the gear teeth, and other elements of the machine, frequently occurs.

The object of my invention is to remedy this defect, and the end in view I attain by connecting one of the driving gears with its shaft in such manner that if the gear, during the operation of the machine, be subjected to an excessive strain its connection with the shaft will be broken, and the latter thus being free to revolve independent of the gear, the action of the internal devices will be arrested, and the otherwise liability of disruption of the parts will be obviated.

The invention comprises novel features of construction which will be hereinafter duly described and claimed.

Referring to the annexed drawings, A, Fig. 1, represents the working or receiving chamber of an ordinary clay comminuting mill; B, a shaft extending longitudinally through said chamber, and carrying the series of knives, $b'$, for acting upon the clay; C, a bevel gear wheel on one end of said shaft, and D a pinion geared with the wheel C and mounted upon a shaft E which is driven from some suitable source of power. These parts, with the exception of the pinion D, are identical in all respects with the like parts of clay comminuting mills of well-known construction. Heretofore in those mills, the pinion D has been keyed fast to its shaft, in consequence of which, if the rotation of the shaft (B) were forcibly interrupted, by a large stone or other hard foreign thing in the clay obstructing the path of the knives, the teeth in either or both the gears would be broken or twisted, and the knives and other parts of the machine would sometimes be likewise affected. Instead, however, of thus keying the pinion D fast upon its shaft, I mount the pinion upon the latter in a novel manner, whereby the defect aforementioned, is remedied, as follows:

The pinion D is set loosely upon the shaft, so as to be freely revoluble thereon, and a sleeve $e'$ is keyed fast to said shaft adjacent to the inner end of the pinion. The latter is provided, preferably with a flange, $d'$, while the sleeve is equipped with an ear $e^2$ contiguous to the flange. Formed in said ear and flange are registering sockets or perforations, 2, 1, respectively, within each of which is fitted a bushing F, preferably of hardened steel. Extending through the bushings is a pin G, of wrought iron usually, which is clamped in place, in the present instance, by means of a set-screw $g'$ working in the edge of the ear $e^2$, as seen most clearly in Figs. 2 and 3. Pin G is much weaker than the engaging teeth of the coacting gears, C D, so that if the gears be subjected to an unusual strain or shock, from any cause, the pin will be broken, whereupon the pinion D will be loose upon its shaft, and the latter free to revolve independently of the pinion. When the shaft B is abnormally arrested as just described, the bushing in the sleeve $e'$ in conjunction with that in the flange $d'$ will neatly shear or cut off the soft-metal pin G at a point between the bushings. By this construction, it will be apparent that the liability of the breaking or twisting of the gear teeth, or other members of the machine, under the circumstances stated, will be overcome.

When the obstruction is removed from the apparatus, the parts of the broken pin may be readily removed, and a new pin just as readily substituted therefor.

Although I have shown and described my invention as applied to a clay working mill, yet evidently the invention is applicable, with equally good effect, to other kinds of machinery wherein toothed gearing is employed.

Having thus described the invention, I claim—

1. The combination with a shaft, a wheel thereon, a sleeve or projection adjacent to said wheel, bushings in said sleeve or projection and wheel, and a break-pin extending through said bushings, substantially as and for the purpose set forth.

2. The combination with a rotatable shaft, of a sleeve fast thereon, a gear wheel on said shaft, bushings in said sleeve, and the pin extending through said bushings, together with the set-screw $g'$, substantially as described.

In testimony whereof I have hereunto affixed my signature this 3d day of August, A. D. 1891.

HOWARD K. KING.

Witnesses:
JOHN N. COBB,
E. C. WALTON.